United States Patent [19]

Gall et al.

[11] Patent Number: 4,847,685

[45] Date of Patent: Jul. 11, 1989

[54] AUDIENCE SURVEY SYSTEM

[75] Inventors: Richard C. Gall, Middleton; Donald A. Weigt; Steven L. Paugh, both of Madison, all of Wis.

[73] Assignee: Audience Information Measurement System, Madison, Wis.

[21] Appl. No.: 82,587

[22] Filed: Aug. 7, 1987

[51] Int. Cl.$^{4}$ ........................ H04H 9/00; H04N 17/00

[52] U.S. Cl. ........................................... 358/84; 455/2

[58] Field of Search ................. 358/84; 379/92; 455/2

[56] References Cited

U.S. PATENT DOCUMENTS

| | | | |
|---|---|---|---|
| 2,903,508 | 9/1959 | Hathaway | 358/84 |
| 3,130,265 | 4/1964 | Leonard | 358/84 X |
| 3,312,900 | 4/1967 | Jaffe | 358/84 |
| 3,372,233 | 3/1968 | Currey | 358/84 |
| 3,806,805 | 4/1974 | Wall | 358/84 X |
| 4,027,332 | 5/1977 | Wu et al. | 358/84 X |
| 4,031,543 | 6/1977 | Holz | 358/84 X |
| 4,511,917 | 4/1985 | Köhler et al. | 358/84 |
| 4,577,220 | 3/1986 | Laxton et al. | 358/84 |
| 4,697,209 | 9/1987 | Kiewit et al. | 358/84 |

FOREIGN PATENT DOCUMENTS

| | | | |
|---|---|---|---|
| 3401762 | 8/1985 | Fed. Rep. of Germany | 358/84 |

*Primary Examiner*—Keith E. George

[57] ABSTRACT

A system for automatically surveying television viewership detects horizontal and vertical synchronization signals and determines the relative phases of these signals with respect to a time base counter in a survey unit. All stations in the viewing area are monitored to determine the relative phases of the broadcast synchronization signals with respect to a time base counter of the monitoring unit. Then, the data are correlated to determine the channels being viewed. Correlation is made by comparing the direction and magnitude of phase shifts of the synchronization signals in the surveyed unit with the data produced by the unit monitoring all stations.

14 Claims, 5 Drawing Sheets

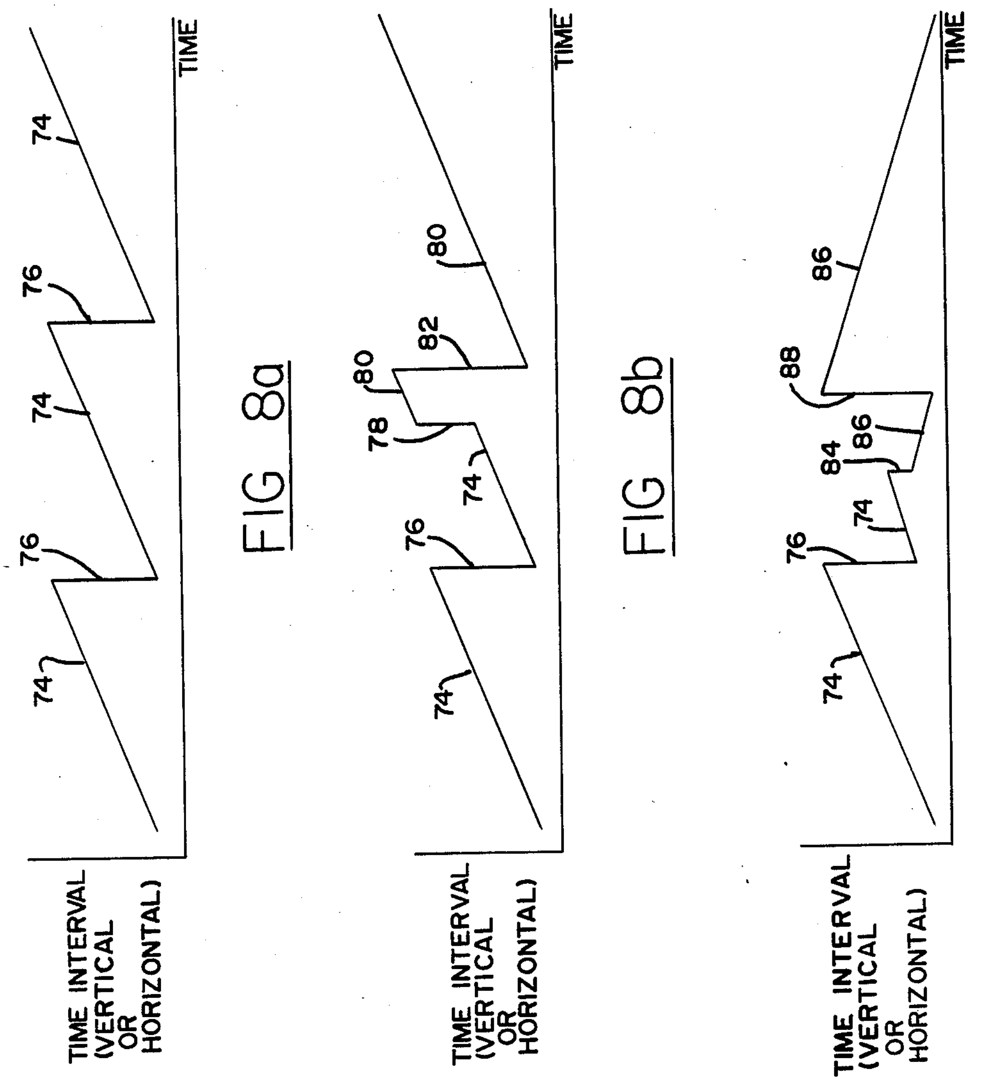
FIG 8a
FIG 8b
FIG 8c
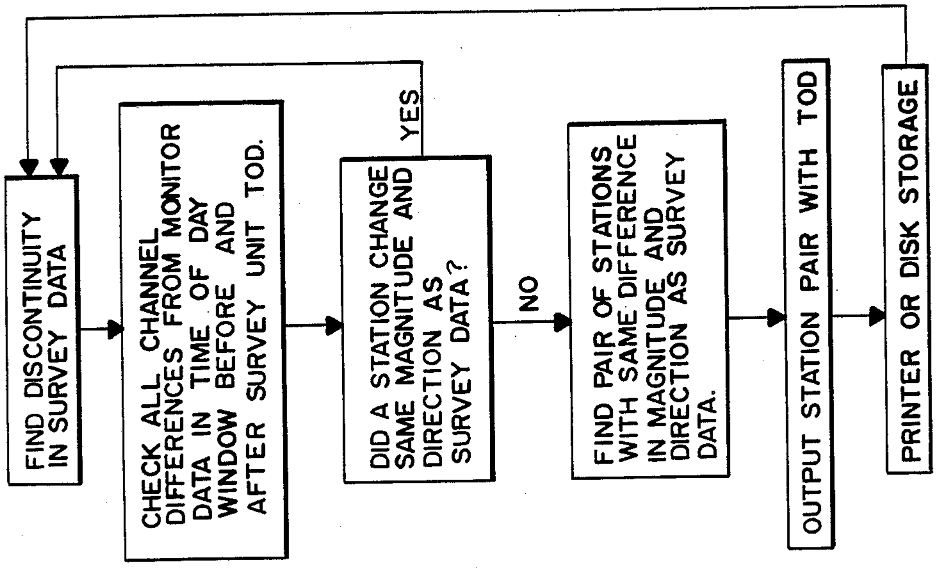
FIG 9

AUDIENCE SURVEY SYSTEM

TECHNICAL FIELD

This invention relates to the art of monitoring the station to which a receiver is tuned. In a preferred embodiment, the invention relates to the monitoring of a television receiver.

BACKGROUND ART

It is known to conduct surveys of television audiences to determine the popularity of television programs. Various systems have been developed for automatically determining which station is being viewed to reduce the interaction between the person conducting the survey and the television viewer.

U.S. Pat. No. 2,903,508 (Hathaway) teaches a survey system wherein the horizontal or vertical synchronization signals are subjected to a cyclical phase shift to "tag" the broadcast signal. Then, a magnetic induction pickup receives the synchronization signals emanated by a television receiver and processes these signals to detect the cyclical phase shift. A second receiver is tuned to a known station, and the cyclical phase shift signals are compared to those of the television set being monitored. When the cyclical phase shifts match, it is concluded that the television set being monitored is tuned to the same station as that of the known television receiver.

U.S. Pat. No. 3,130,265 (Leonard) teaches a system for determining the channel to which a television receiver is tuned which also relies upon detection of the phase of synchronization (sync) pulses. In this system, transmitters are controlled so that the sync pulse of each transmitter is out of phase by a known amount with respect to the sync pulses of all other transmitters. This system requires that the conductor of the survey have control over the broadcast transmitters.

Systems such as those shown in U.S. Pat. Nos. 3,312,900 (Jaffe) and 4,577,220 (Laxton et al.) detect the frequency to which a local oscillator of a receiver is tuned to determine the channel beign viewed by a television user.

In a system shown in U.S. Pat. No. 3,806,805 (Wall), a television receiver imposes a load variation pattern on the main power supply line which is representative of the channel to which the receiver is tuned. An audience measuring system is responsive to variations in the main power supply line to identify the station.

U.S. Pat. No. 3,372,233 (Currey) teaches a monitoring system wherein the sync signal of a monitored receiver is combined with the sync signal of a receiver tuned to a known station. The phase relationship of these two sync signals indicates whether the monitored receiver is tuned to the known station.

SUMMARY OF THE INVENTION

A survey system in accordance with the invention requires no physical connection to the television receiver being surveyed. A survey unit including an induction coil is placed adjacent the receiver being surveyed, and the survey unit detects the varying magnetic fields emanating from the receiver's horizontal and vertical deflection coils. The magnetic fields are treated to produce horizontal and vertical sync pulses, and respective relative phases of the horizontal and vertical sync pulses are determined with respect to a time base generator.

A monitoring unit monitors all stations in the broadcast area and stores data reflecting the relative phases of the vertical and horizontal sync pulses for each of these stations with respect to a time base generator contained in the monitoring unit. Control over the broadcast signals is not necessary.

Data representing the phases of the horizontal and vertical sync pulses from the survey unit are recorded in an electronic memory and periodically compared with that data generated by the monitoring unit which has monitored all stations in the broadcast area. The comparison of the data from the monitor unit with that of the survey unit reveals the stations viewed by the survey unit.

An object of this invention is to provide a survey system wherein a channel being viewed is determined by comparing phases of synchronizing signals of known stations with detected phase shifts of synchronizing signals.

Another object of this invention is to provide a survey system which does not require physical connection to the receiver being monitored or control over the broadcast signal.

Yet another object of this invention is to provide a survey system wherein surveyed data may be electronically stored, collected, and automatically compared with known data to produce a survey report.

BRIEF DESCRIPTION OF THE DRAWINGS

FIGS. 8*a* through 8*c* are graphical representations of the phases of vertical or horizontal synchronization pulses.

FIG. 9 is a flow diagram illustrating a process for correlating data from survey units with data from the monitoring unit to determine the stations to which the receivers were tuned.

DETAILED DESCRIPTION OF THE INVENTION

Figure 1:
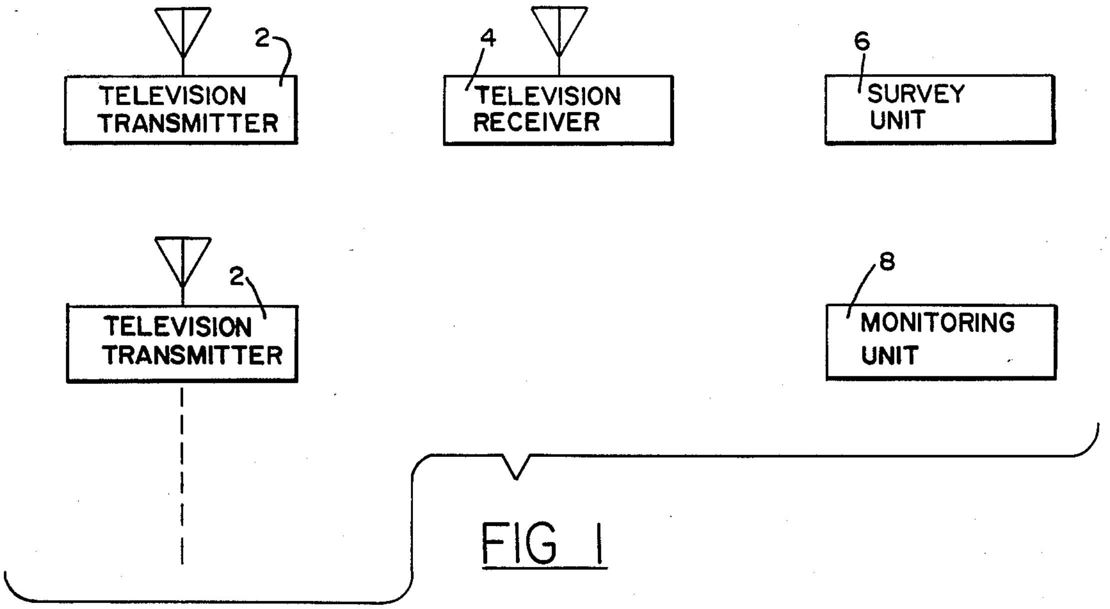
FIG. 1 is a block diagram of a survey system in accordance with the invention when utilized with broadcast signals.

With reference to FIG. 1, a plurality of television transmitters 2 broadcast electromagnetic signals in a known fashion. A receiver 4, the viewing of which is to be surveyed, is located within the broadcast area of the transmitters 2. A survey unit 6 in accordance with the invention, which will be described more fully below, is placed adjacent television receiver 4. Also located within the broadcast area of the television transmitters is a monitoring unit 8 which receives signals from all stations in the broadcast area and which will also be described more fully below.

Figure 2:
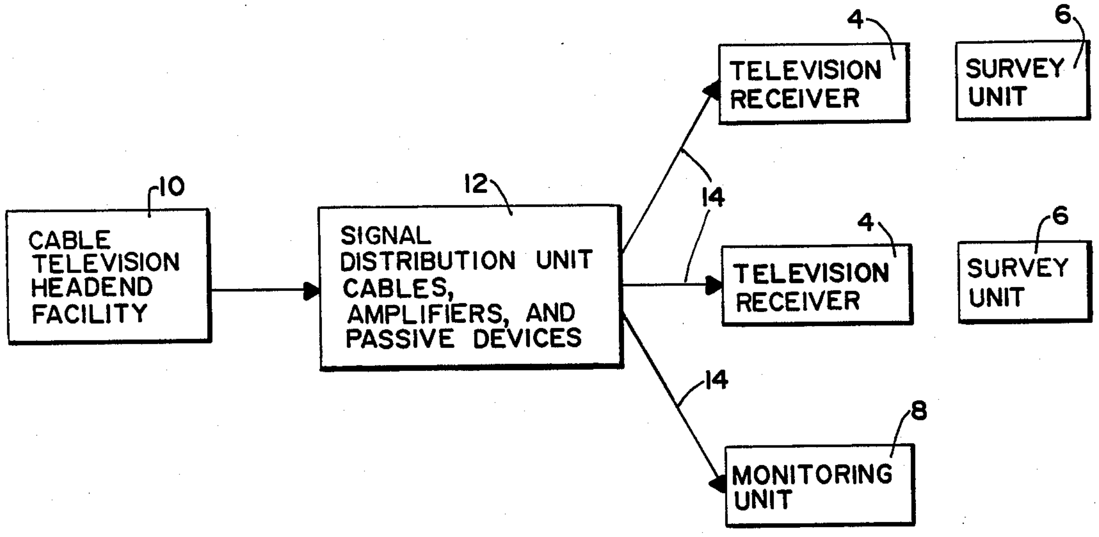
FIG. 2 is a block diagram of a survey system in accordance with the invention used with a cable television system.

With reference to FIG. 2, a plurality of television transmitters 2 as shown in FIG. 1 may be replaced by a cable television headend facility 10 and a cable signal distribution unit 12. Signal distribution unit 12 is connected to television receivers 4 and to monitoring unit 8 by cables 14.

Figure 3:
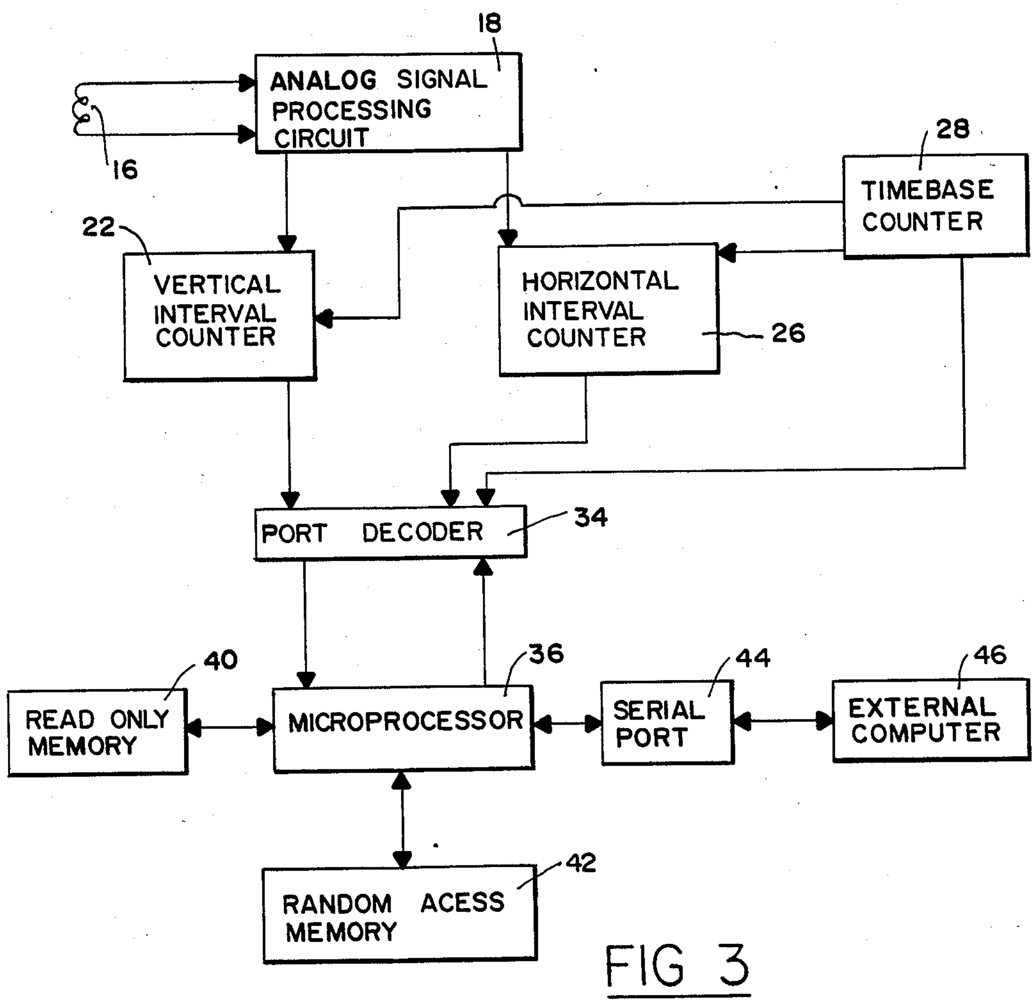
FIG. 3 is a block diagram of a survey unit in accordance with the invention.

FIG. 3 is a block diagram of a survey unit 6. An induction coil 16 receives signals emanated by the horizontal and vertical deflection coils of a television receiver 4, and current induced in induction coil 16 by these varying fields is applied to analog signal processing circuit 18. A survey unit is placed adjacent each receiver, and coil 16 is designed in a known manner to be sensitive only to those signals. Signal processing circuit 18 comprises known components such as amplifiers and filters to isolate pulses representing horizontal and vertical synchronization signals.

The vertical signal is conducted to a vertical interval counter 22, and the horizontal signal is conducted to a horizontal interval counter 26.

Vertical interval counter 22 and horizontal interval counter 26 determine, respectively, the relative phases of the vertical and horizontal synchornization pulses with reference to a time base provided by time base counter 28, which is connected to vertical interval counter 22 and horizontal interval counter 26. Vertical interval counter 22 and horizontal interval counter 26 measure the time between a reference pulse of the time base counter 28 and a horizontal or vertical synchronization signal by starting a count with a synchronization pulse and stopping the count with the time base reference. Time base counter 28 preferably provides two frequencies, each of which is on the order of a respective horizontal or vertical scan rate of the television receiver. Interval counters 22 and 26 thus measure and store relative phases of horizontal and vertical synchronization pulses until caused by port decoder 34 to transmit the measured intervals to microprocessor 36. Port decoder 34 monitors the status of interval counters 22 and 26 and is also connected to time base counter 28.

Microprocessor 36 is controlled by a read only memory (ROM) 40 and communicates with a random access memory (RAM) 42.

Microprocessor 36 transmits selected horizontal and vertical time intervals through serial port 44 to external computer 46.

Figure 4:
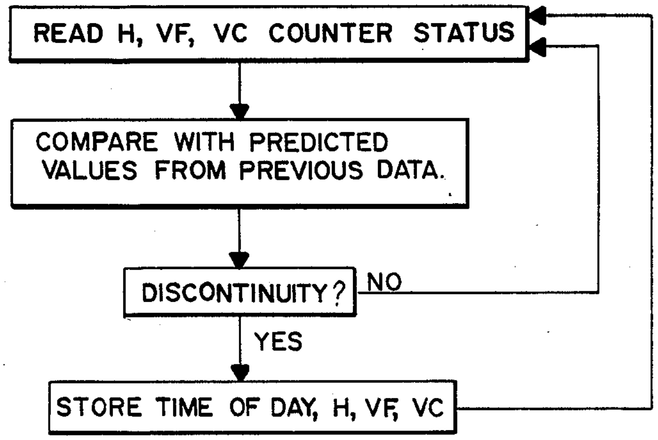
FIG. 4 is a flow diagram of a process used in a survey unit in accordance with the invention.

The process by which microprocessor 36 examines the data from the interval counters is shown in the flow diagram of FIG. 4. Microprocessor 36 reads three values produced by vertical interval counter 22 and horizontal interval counter 26. From horizontal interval counter 26, microprocessor 36 obtains a time interval (H) between horizontal pulses derived from the television set's magnetic field and horizontal pulses from time base counter 28. Each count of the horizontal time interval is, in the preferred embodiment, 0.279 microseconds. Secondly, microprocessor 36 obtains the least and most significant bytes (VF,VC) produced by vertical interval counter 22 of the time interval between vertical pulses derived from the television set's magnetic field and pulses from time base 28. Each count of the least significant byte is 0.279 microseconds, and each count of the most significant byte is 71.52 microseconds, in the preferred embodiment.

After reading these values, the microprocessor compares them with predicted values obtained by a linear extrapolation of previous readings. If the read values are within a window centered on the predicted values, the new values are not stored. If the new values fall outside the predicted value window, a discontinuity is identified, and the new values are stored in RAM 42, along with the time of day. In the preferred embodiment, the values before and after the discontinuity are stored. Alternatively, the magnitude and direction of the discontinuity may be stored.

Thus, RAM 42 need not have a large capacity because microprocessor 36 stores only data having significance.

After a predetermined time, microprocessor 36 transfers data from RAM 42 to external computer 46. For example, a survey unit may be mailed to a survey customer and returned after the survey period with the significant information stored in RAM 42. For analysis of the stations viewed, which will be described more fully below, the data from RAM 42 is then transmitted to external computer 46.

In addition to the vertical and horizontal interval counts described above, microprocessor 36 may be designed to record additional information unrelated to the intervals. For example, the survey unit may permit identification of a viewer, and that information would be transmitted to microprocessor 36 for eventual transmission to external computer 46 to allow identification of not only the channel being viewed, but also the particular viewer.

Figure 5:
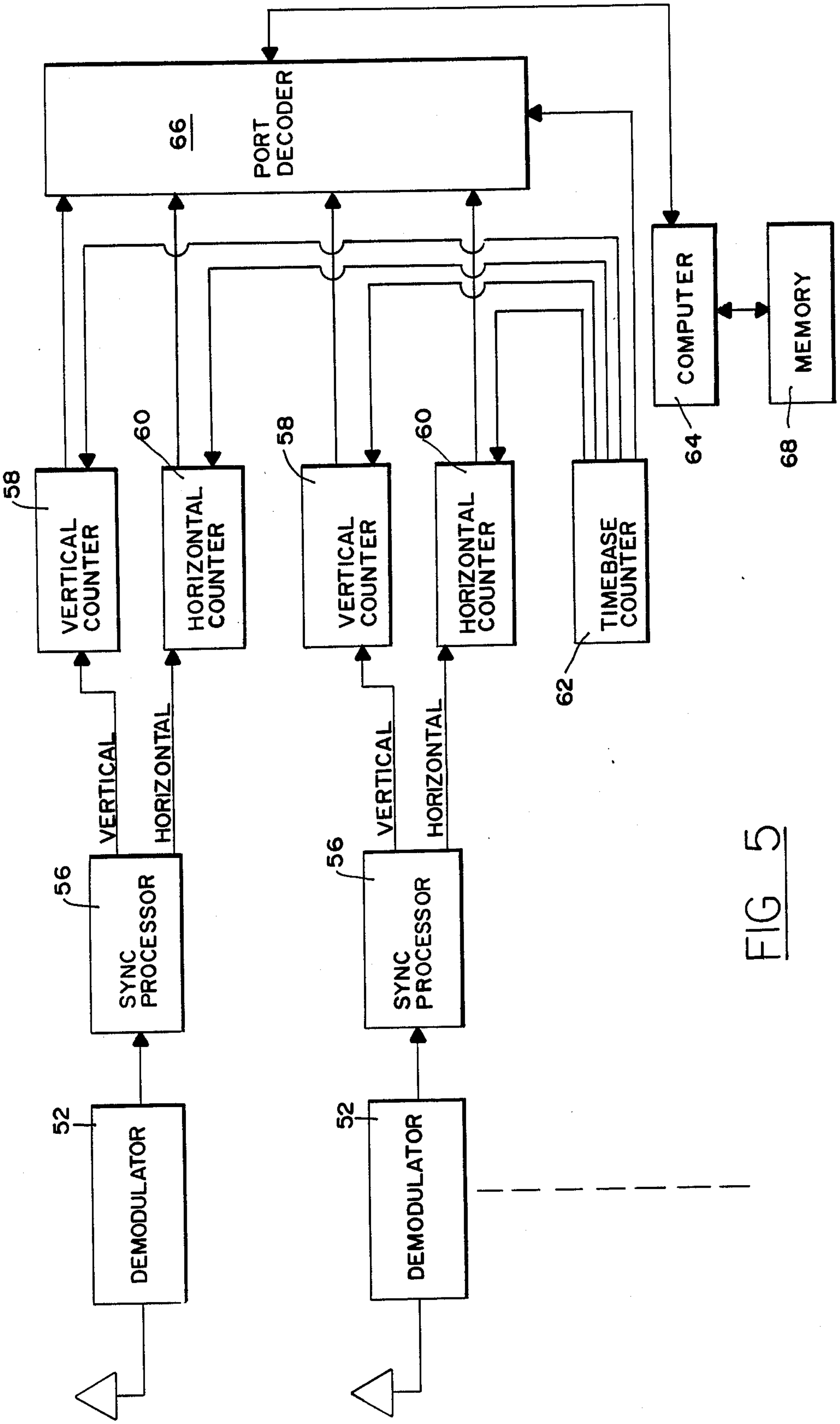
FIG. 5 is a block diagram of a monitor unit for use with broadcast signals.

FIG. 5 is a block diagram of a monitor for receiving broadcast signals. Each demodulator 52 is tuned to a selected channel, and the television signals for each channel are supplied to a sync processor 56 for detection of horizontal and vertical synchronization signals. These synchronizaton signals are a part of the complex wave broadcast by a television station and are the synchronization signals used by a television receiver to synchronize the electron beam scanning to maintain the picture stationay. Signals representing the horizontal and vertical synchronization pulses are supplied to vertical interval counter 58 and horizontal interval counter 60, respectively.

A time base counter 62 provides a reference for determining the vertical and horizontal intervals substantially as described above with respect to FIG. 3. Namely, the horizontal and vertical intervals are started with horizontal and vertical sync pulses and are stopped with a reference point of the time base counter 62, in the preferred embodiment. The horizontal interval count, and the least and most significant bytes of the vertical interval are stored in vertical and horizontal interval counters 58, 60 and are transmitted to computer 64 by way of port decoder 66. Data is stored in an external memory 68, such as a hard disk.

Figure 6:
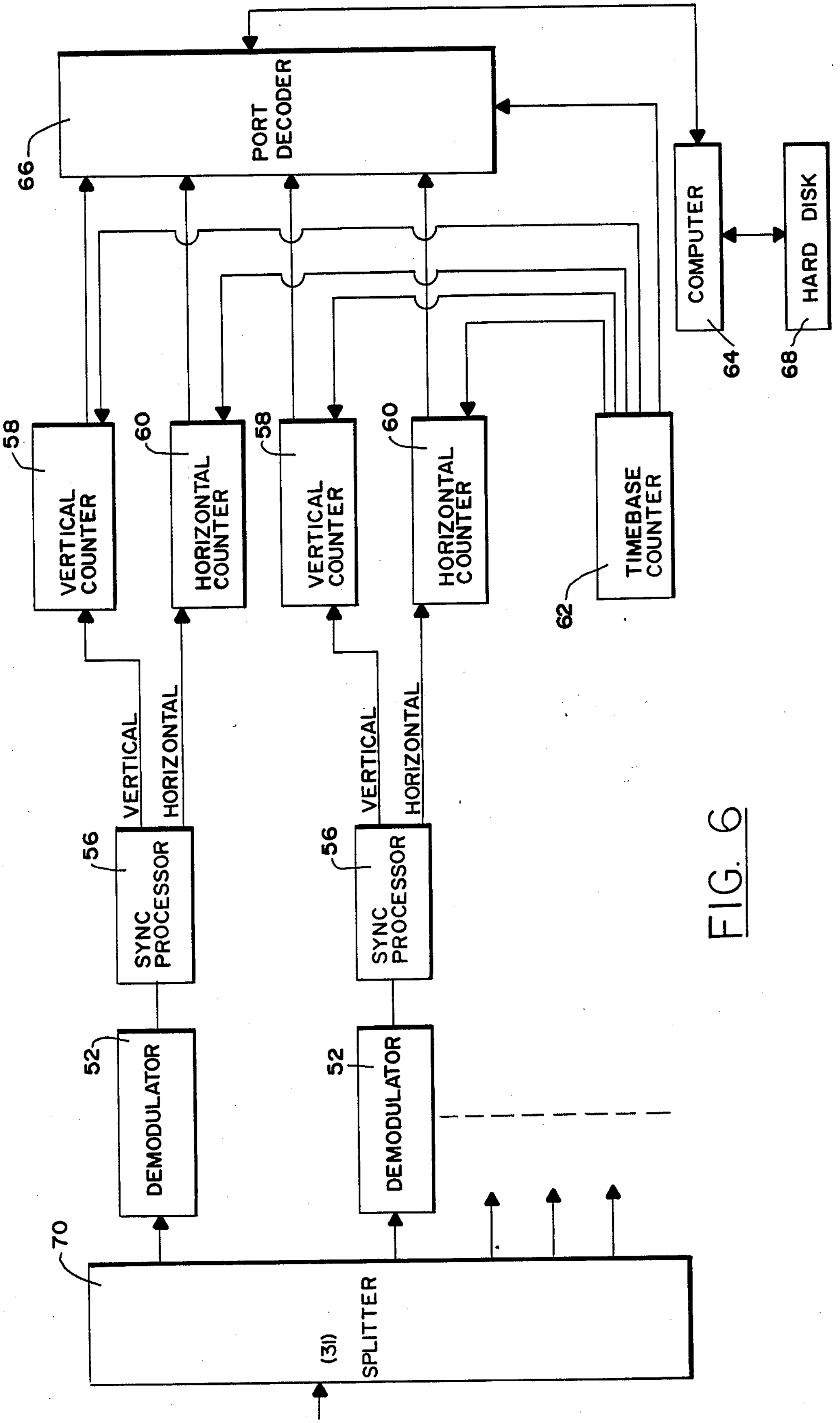
FIG. 6 is a block diagram of a monitor unit for use with a cable system.

FIG. 6 illustrates a system substantially the same as that shown in FIG. 5, but designed for use with a cable television system. Splitter 70 receives an input from the cable television system at 72 and splits the signal to supply it to a plurality of demodulators 52. After the signal has been split by splitter 70, the operation and components are the same as that described with respect to FIG. 5.

Figure 7:
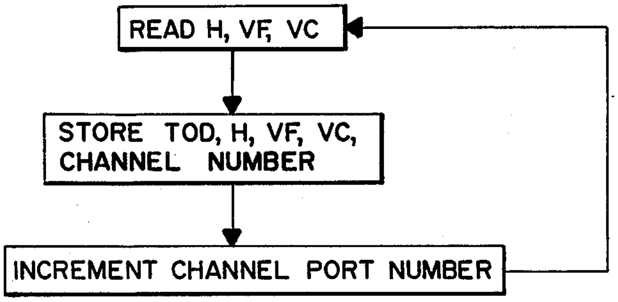
FIG. 7 is a flow diagram of a process for the monitor of the invention.

FIG. 7 is a flow-chart showing operation of computer 64 of FIGS. 5 and 6. Computer 64 instructs port decoder 66 to read the horizontal interval from a horizontal counter 60 and the least and most significant bytes of the vertical interval from vertical interval counter 58. These intervals are stored along with the time of day and the channel port number, and the channel port number is then incremented to read this information for the next channel port. It will be appreciated that while FIGS. 5 and 6 imultaneously monitor parallel channels, it is possible to monitor a single channel and to sequentially tune each channel to be monitored. In this situation, the flow chart of FIG. 7 would be modified to include a tuning step prior to the reading step. A combination of these two system may also be employed.

The portions of the invention described thus far relate to the collection of data from the survey units and from the monitoring unit. It is, next, necessary to analyze this data to determine the channel being viewed on the television receiver being surveyed. FIGS. 8*a* through 8*c* are graphical representations of the data produced by a survey unit, such as that shown in FIG. 3, or a particular channel of a monitoring unit such as shown in FIG. 5 or 6.

With reference to FIG. 8*a*, it will be seen that the vertical or horizontal time interval is drifting as indicated by the upwardly sloping lines 74. At vertical lines 76, the time base counter has "rolled over" because the measured time interval became too large. If the data illustrated by FIG. 8*a* is obtained from a survey unit it is concluded that a single channel whose sync signal phase is drifting is being viewed.

With reference to FIG. 8*b*, a discontinuity has occurred at 78, indicating that a significant change in the phase of the synchronization signals has occurred. New upwardly sloping lines 80 are established, a "roll over" being indicated at 82. The discontinuity at 78 would be recognized as significant by microprocessor 36 and would be recorded in accordance with the process shown in FIG. 4. The mere presence of a discontinuity does not mean that a channel change has been made, as will be described below.

With reference to FIG. 8*c*, it will be appreciated that a discontinuity has occurred at 84 and that downwardly sloping lines 86 indicate that a drift in a direction opposite to that illustrated in FIG. 8*a* has been established. Another "roll over" is indicated at 88.

With reference to FIG. 9, the steps to be taken to correlate the data from the survey units and from the monitor unit to determine the channel being watched are set forth. Such a correlation is preferably conducted by an electronic computer. For example, computer 64 of FIGS. 5 and 6 may be used to conduct the correlation shown in FIG. 9. In this embodiment, the external computer 46 as shown in FIG. 3 would unload its data into computer 64 or in memory means 68.

With reference to FIG. 9, the survey data from a survey unit shown in FIG. 3, such as data transported to the correlation unit by external computer 46, is analyzed to ascertain the significance of each discontinuity, such as that shown at 78 and 84 of FIGS. 8*b* and 8*c*, respectively. The data from the monitor unit is analyzed for a predetermined "window" of time centered on the time at which the discontinuity appeared in the survey data. If the phases of the synchronization signals of a monitored station changed in the same magnitude and direction as that of the selected discontinuity in the survey data, it is assumed that no channel change was effected. It is not uncommon for the phase of the synchronization signals from a single station to change. For example, if a local station switches from local programming to the broadcast of signals received from another source, the phases of the synchronization signals will change. In such a situation, the survey data is analyzed further to detect the next discontinuity, and the first three steps of the process of FIG. 9 are repeated. If it is determined that the phases of the synchronization signals of a single station did not change in the same manner as in the survey data, the data from all stations are analyzed to select a pair of stations having the same magnitude and direction of phase difference between the two sets of sync signals as is reflected by the discontinuity in the survey data. Then, this station pair is noted along with a signal indicating the time of day of the discontinuity, and this information is stored.

It will be appreciated that complete information regarding the viewing of the surveyed television receiver is available by knowing the two stations involved in the channel selection and the time of day of each discontinuity. For example, when the survey unit is first installed, it determines the phases of the synchronization signals with respect to the time base counter of the survey unit. If no discontinuity is ever detected, it may not be possible to determine the channel viewed. It is highly unlikely, however, that a viewer will never change the channel of the television receiver. When a channel change is made, a discontinuity will result, thus permitting one to determine the two channels involved in the change. Then, it is concluded that the television station was tuned to the first channel from the time of installation of the survey unit until the time of the discontinuity, whereupon the second channel was viewed.

Moreover, because of phase shifts in the synchronization signals of the transmitting units, it is often possible to identify a channel being viewed by analyzing the discontinuities due to events other than a change of receiver stations. For example, if a phase change due to other causes is unique, this would indicate the channel to which a surveyed unit is tuned.

The methods shown in the flow charts may be programmed on a wide variety of known computers or microprocessors and may be expressed in a variety of known computer languages.

Other modifications within the scope of the appended claims will be apparent to those who are skilled in the art.

What is claimed is:

1. Apparatus comprising detection means for detecting a time-varying magnetic field produced by a deflection coil of a cathode ray tube, clock means for producing pulses at a predetermined rate, interval measuring means for determining a survey time interval between a pulse of said magnetic field and a reference pulse of said clock means, and storage means for storing said survey time interval.

2. Apparatus according to claim 1 wherein said time-varying magnetic field is produced by horizontal and vertical deflection coils.

3. Apparatus according to claim 1 further comprising monitoring means for monitoring the phase of electromagnetic signals comprising means for detecting said electromagnetic signals, clock means for generating pulses, and interval measuring means for determining a monitor time interval between a selected pulse of said electromagnetic signals and a reference pulse of said clock means of the monitoring means, and means for comparing said monitor time interval to said survey time interval.

4. Apparatus according to claim 3 wherein said monitoring means comprises tuning means for selecting said electromagnetic signals on the basis of frequency.

5. Apparatus according to claim 4 wherein said monitoring means comprises antenna means for receiving said electromagnetic signals from a broadcast signal.

6. Apparatus according to claim 4 wherein said monitoring means comprises means for receiving said electromagnetic signals from a transmission cable.

7. Apparatus according to claim 4 wherein said monitoring means comprises means for storing a plurality of said monitor time intervals.

8. Apparatus for determining the station to which a receiver is tuned comprising survey means for detecting from said receiver and phase of a characteristic of a signal of said station with respect to a first time reference, monitor means for receiving signals from a plurality of stations to which said receiver could be tuned and for determining the phase of said characteristic of a signal from each of said plurality of stations with respect to a second time reference, and correlation means for correlating changes of phase detected by said survey means with phase detected by said monitor means to identify said station.

9. Apparatus according to claim 8 wherein said survey means comprises a first time interval counting means for measuring a time interval between occurrence of a said characteristic of a signal to which said receiver is tuned and said first time reference, and said monitor means comprises a second time interval counting means for measuring a time interval between occurrence of a said characteristic of a signal of one of said plurality of stations to which said receiver could be tuned and said second time reference.

10. Apparatus according to claim 9 wherein said survey means further comprises processor means for comparing time separated phases of said characteristic of a signal of a station to which said receiver is tuned and for determining whether a significant discontinuity in said phase has occurred.

11. Apparatus according to claim 10 further comprising means for storing data representative of a said significant discontinuity.

12. Apparatus according to claim 10 wherein said first time reference is produced by a first clock means for producing first clock pulses and said second time reference is produced by a second clock means for producing second clock pulses.

13. Apparatus according to claim 12 wherein said characteristic is a synchronization pulse.

14. A method for determining the station to which a receiver is tuned comprising detecting from said receiver the phase of a characteristic of a signal of said station with respect to a first time reference, monitoring signals from a plurality of stations to which said receiver could be tuned and determining the phase of said characteristic of a signal from each of said plurality of stations with respect to a second time reference, and correlating changes of phase with respect to said first time reference with phases detected with respect to said second time reference.

* * * * *